Figure 1:
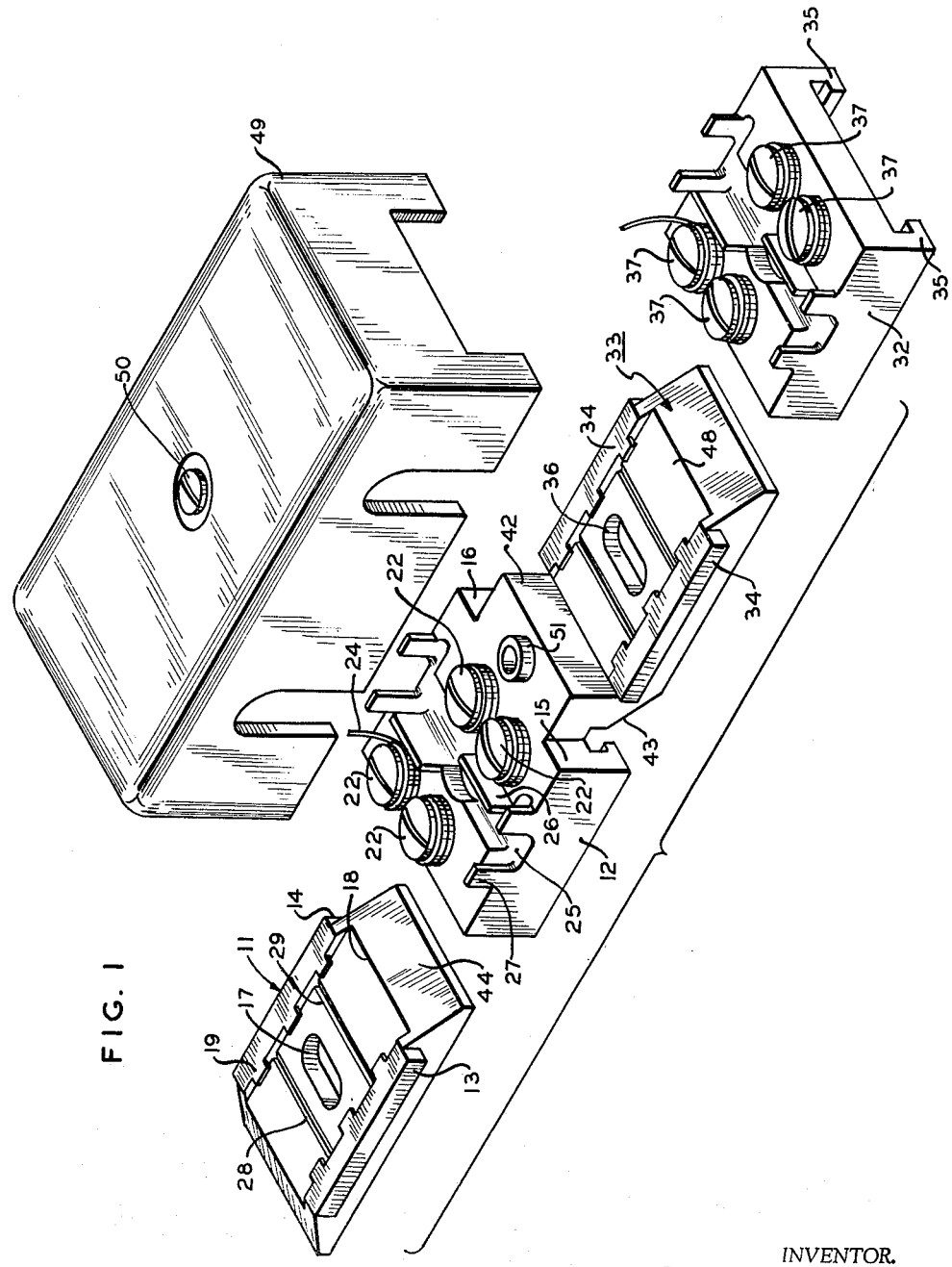

April 6, 1965 R. W. CROGHAN 3,177,457

MOUNTING AND TERMINAL BLOCK

Filed June 19, 1962 2 Sheets-Sheet 1

INVENTOR.
R. W. CROGHAN
BY
*Harry Sommer*
ATTORNEY

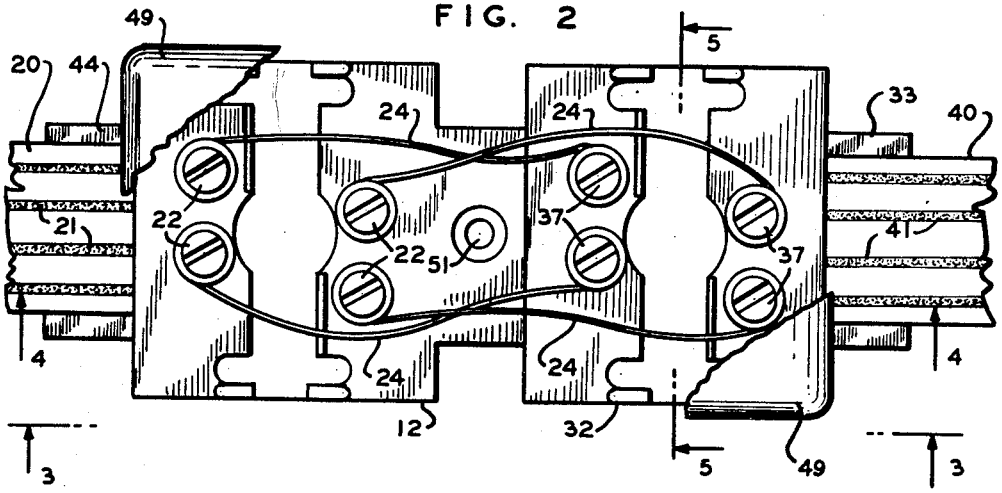
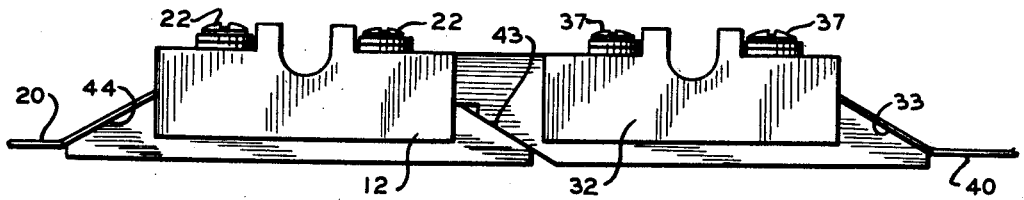
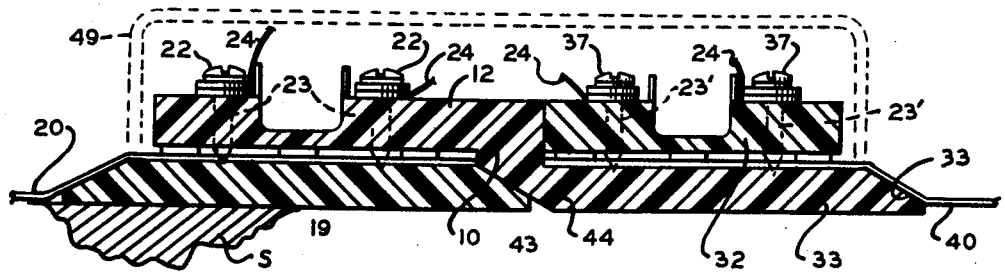
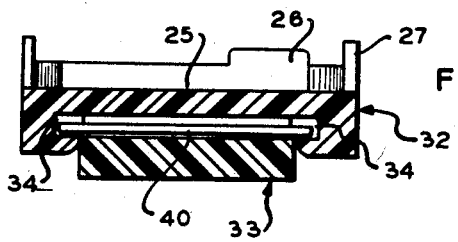

United States Patent Office 3,177,457
Patented Apr. 6, 1965

3,177,457
MOUNTING AND TERMINAL BLOCK
Robert W. Croghan, Staten Island, N.Y., assignor to The
Thomas & Betts Co., a corporation of New Jersey
Filed June 19, 1962, Ser. No. 203,613
7 Claims. (Cl. 339—97)

This invention relates to a device for interconnection of conductors—for example, where it is desired to connect conductors at a given station to conductors, devices or other stations and for many other electrical uses.

The connector of this invention comprises a mounting block adapted to be secured to a supporting surface at a given location, enabling connections to be made therefrom and therewith as desired from time to time.

The invention may be used to connect conductors of a first dielectric sheath selectively to other conductors and may serve as a mounting block, for example, to receive one end of a dielectric sheath containing current carrying or other conductors with other conductors engaging said block and with the conductors in the sheath, thus attaining a connection therebetween. The device in one form is further adapted to be selectively used as a "jumper" for connection of the desired conductors of a pair of sheaths selectively with each other and with other conductors.

The present invention provides means for effecting such connection, conveniently, accurately, without damage and without the use of special dexterity or special tools, and further without limitation to size of wires or other conductors to be so connected.

The drawings, illustrating procedures and devices useful in carrying out the invention, and the description below, are exemplary only of the invention, which shall be deemed to cover all other devices and procedures coming within the scope and purview of the appended claims.

In the drawings, wherein similar reference characters indicate like parts:

FIG. 1 is a perspective, exploded view of a first terminal bearing block having a second mounting block extending therefrom, a second terminal bearing block and a cover, adapted to enclose all the parts on assembly as shown in dotted lines in FIG. 4, FIG. 2 is a top plan view of said parts shown assembled, with flat conductor sheaths thereby connected shown fragmentarily extending therefrom, FIG. 3 is a side elevational view thereof, taken at line 3—3 of FIG. 2, the cover being omitted, FIG. 4 is a longitudinal sectional view, taken at line 4—4 of FIG. 2, and FIG. 5 is a transverse sectional view taken at line 5—5 of FIG. 2.

As shown in the drawings, the connector 10 of this invention (FIG. 4) comprises (FIG. 1) a first mounting block 11 and a first bearing block 12, said mounting and bearing blocks being provided with complementary means such as marginal flanges 13, 14 on one of said members adapted to be slidably received in complementary channelled portions 15, 16 on the other. The first mounting block 11 may be provided with apertures 17 for passage therethrough of bolt or other means for holding the first mounting block on a supporting surface, schematically indicated at S in FIG. 4, which may be a wall or other part of a building or apparatus or equipment. The first mounting block 11 is preferably provided with longitudinally recessed portion 18 which may have marginally extending thereover in spaced relation, fingers 19 to receive and guide a first dielectric flat sheath 20 which (FIG. 2) may have a plurality of conductors 21 dielectrically embedded therein as is familiar to those skilled in this art.

Selected conductors 21 to be connected may have their dielectric covering scraped or otherwise removed prior to insertion between the first mounting block and the first bearing block, or the dielectric covering may be removed by the action of threading the contact screws 22 in the threaded openings 23 in (FIG. 4) the first bearing block 12 and against the sheath 20. On assembly of the parts, the first bearing block 12 may be slid longitudinally on the first mounting block 11 and then the screws 22 moved to the position (FIG. 4) at which they engage or bear against the conductors 21 to be thus connected with wires such as schematically shown at 24 to thus connect conductors 21 with equipment or other circuits. Wires or harnesses of wires may be positioned within wire receiving recessed portions 25 of the first bearing block 12 (FIG. 1) and antishort ledges 26 provided as well as end guides 27 therefor, and further transverse guides 26.

A second terminal bearing block 32 (FIGS. 1 and 5) may be provided, pursuant to the invention, and a second mounting block 33 provided. Said members may have complementary interengaging marginal flanges and channelled portions 34, 35, for sliding of the second bearing block 32 onto the second mounting block 33, on assembly of the parts. Transverse recesses 28, 29 (FIG. 1) may be provided in the first mounting block 11 to enable contact screws 22 (FIG. 4) to press the sheaths 20 against said recesses while contacting the bared conductors 21 or to cut through the insulation and make contact with the conductors. The second terminal bearing block 32 and the second mounting block 33 are provided with screws 37 likewise movable in threaded openings 23' (FIG. 4) in the second terminal bearing block 32, against a second flexible sheath 40 (FIG. 4) having conductors 41 dielectrically sheathed therein, said sheath 40 being positioned intermediate the second terminal bearing block 32 and the second mounting block 33 in recess 48 (FIG. 1) of second mounting block 33.

On assembly of the parts as shown in FIG. 4 the device may be used to connect wires to one or both cables or for interconnection of the wires between the contact screws 37 and 22 to effectively splice the first and second flexible sheaths 20 and 40 or for other connection purposes.

The second mounting block 33 may be secured to the first bearing block 12 by a unitary plate 42 extending from the first bearing block and having the second mounting block 33 extended therefrom in downwardly offset relation. The plate 42 and the first mounting block 11 may be provided with complementary means, such as tapered surfaces 43, 44 (FIG. 4) respectively so that the second mounting block 33 may be seated against the first mounting block 11 and the parts thereby aligned in registry. A suitable cover 49 may be provided for the entire assembly and a mounting screw 50 (FIG. 1) passed therethrough and into a bearing 51 (FIG. 2) on the first bearing block 12. The first bearing block 12 may be secured to a support by holding means passed through apertures 36 therein (FIG. 1).

Having thus described my invention, what I claim as new and desire to secure by Letters Patent is:

1. A connector for selectively connecting selected conductors carried by a first and second conductor strip, each of which carries conductors within a dielectric sheath, comprising: a first mounting block, a first terminal block, complementary interconnecting means on said first mounting block and said first terminal block for assembly of said blocks with said first conductor strip therebetween, first contact means carried by said first terminal block movable relative to said block between neutral, compressive, and sheath penetrating positions and selectively engageable with said dielectric sheath and selected conductors of said first conductor strip, a second mounting block integral with said first terminal block, a second terminal block, complementary interconnecting means on said second mounting block and said second terminal block for assembly of said blocks with said second conductor strip therebetween, second contact means carried by said second terminal block movable relative to said block between neutral, compressive, and sheath penetrating positions and selectively engageable with said dielectric sheath and selected conductors of said second conductor strip, and connector means selectively interconnecting said first and second contact means to interconnect selected conductors on said first and second conductor strips.

2. In the invention defined by claim 1, said second terminal block being selectively interengageable with said first mounting block and said second mounting block.

3. In a connector for connecting conductors as set forth in claim 1, said first terminal bearing block being adapted to be positioned astride the first mounting block on assembly thereof.

4. In a connector for connecting conductors as set forth in claim 1, said second mounting block extending from the first terminal bearing block in downwardly offset relation thereto and adapted to rest on a supporting surface upon assembly of the first terminal bearing block on the first mounting block.

5. In a connector for connecting conductors as set forth in claim 4, said second terminal bearing block being adapted to abut against the first terminal bearing block and being substantially axially aligned therewith when so assembled on the second mounting block.

6. In a connector for conductors as set forth in claim 1, a plate extending from said first terminal bearing block at one end and fixed thereto at one end and at the other end having the second mounting block fixed thereto.

7. In a connector for connecting wire terminals to conductors in flat sheaths as set forth in claim 6, said plate and first mounting block having complementary portions for abutting engagement on assembly.

References Cited in the file of this patent

UNITED STATES PATENTS

| | | |
|---|---|---|
| 2,743,373 | De Smidt | Apr. 24, 1956 |
| 2,758,280 | More | Aug. 7, 1956 |
| 3,019,408 | Ustin | Jan. 30, 1962 |
| 3,034,091 | Gluck | May 8, 1962 |
| 3,090,028 | Hall et al. | May 14, 1963 |